United States Patent
Brownell

[11] 3,944,799
[45] Mar. 16, 1976

[54] RATIO COMPUTER

[76] Inventor: Peter Gray Brownell, 741 N. Eastland, Elmhurst, Ill. 60126

[22] Filed: Jan. 28, 1974

[21] Appl. No.: 437,327

Related U.S. Application Data

[63] Continuation of Ser. No. 221,718, Jan. 28, 1972, abandoned, which is a continuation-in-part of Ser. No. 37,095, May 14, 1970, abandoned.

[52] U.S. Cl. ........ 235/152; 235/92 EV; 235/92 MP; 318/603
[51] Int. Cl.[2] .................. G07C 15/00; G06F 15/30
[58] Field of Search .......... 235/152, 151.11, 92 DN, 235/92 MP, 92 CC, 92 TF, 92 EV; 318/603; 324/77 B

[56] References Cited
UNITED STATES PATENTS

| | | | |
|---|---|---|---|
| 3,158,854 | 11/1964 | Keen et al. | 235/92 TF |
| 3,549,868 | 12/1970 | Watson et al. | 235/92 DN |
| 3,602,700 | 8/1971 | Jerva et al. | 235/92 MP |

Primary Examiner—Malcolm A. Morrison
Assistant Examiner—Errol A. Krass
Attorney, Agent, or Firm—Neuman, Williams, Anderson & Olson

[57] ABSTRACT

A computer, for use with a machine tool, can make any of a number of calculations involving ratios between two operands to determine the angular velocity of the spindle of the machine, the velocity and position of a movable member such as a carriage, and the ratio between two velocities. Any of such calculations is selected by means of a selector switch and a second selector switch is settable to select a time base for the calculation. The operands are represented by pulses produced by transducers associated with movable members of the machine tool.

17 Claims, 5 Drawing Figures

RATIO COMPUTER

BACKGROUND OF THE INVENTION

This application is a continuation of application Ser. No. 221,718 now abandoned filed Jan. 28, 1972 which was in turn a continuation-in-part application of my copending application Ser. No. 37,095 filed May 14, 1970, now abandoned.

The present invention relates to ratio computers and more particularly to such computers as may be employed in connection with machine tools such as lathes and the like. It is frequently desirable to obtain an accurate indication of any of several parameters related to the operation of the machine. For example, it is sometimes necessary to know accurately the actual revolutions per minute being turned by the spindle of the machine. It is also sometimes necessary to know the ratio between one velocity and another. This is particularly important when it is desired to cut a helix or the like in work held in position on the lathe and turned by the spindle, where the pitch of the helix is determined by the ratio between the velocity of a tool-handling carriage and the angular velocity of the spindle. At other times it is desirable to monitor either the position or the velocity of the tool-holding carriage or some other movable member associated with the machine tool.

An indication of the appropriate parameter must be provided substantially instantaneously on demand of the operator, and the operator must be able to select any of the various parameters for display. The operator must also have control over the time base used for calculating a velocity or a velocity ratio, so that either instantaneous or average velocities are used in effecting the calculations. It is also desirable that the operator be provided with means for initiating calculations at a particular time by the actuation of a manual control so that the information is displayed in reference to a particular time frame.

Accordingly, it is a principle object of the present invention to provide a ratio computer selectively operable to calculate any of a number of parameters involving the velocity of one or more members, using either instantaneous or average velocities.

Another object of the present invention is to provide such a computer embodying manually operable means for initiating the calculation.

A further object of the present invention is to provide such a computer in which substantially all of the components of the computer are employed in calculating substantially all of the parameters selected for calculation.

A further object of the present invention is to provide such a computer, with means for selectively compensating for forward or reverse movement of a movable member.

Another object of the present invention is to provide a transducer for accurately monitoring the position and velocity of a movable member and producing a pulse for each increment of movement thereof.

These and other objects of the present invention will become manifest upon examination of the following description and the accompanying drawings.

In one embodiment of the present invention there is provided a first counter for counting pulses produced in response to incremental movement of a movable member of a machine tool, a source of reference pulses, a second counter connected to the source for counting the reference pulses, a selector switch connected to the second counter and operative to produce a coincidence signal when the second counter has counted a preselected number of reference pulses, and an indicator connected to the first counter and to the selector switch to display the number of pulses counted by the first counter during the interval ending with the production of said coincidence signal.

In another embodiment of the present invention, means are provided for causing the first counter to count up or down, in response to the direction of motion of the movable member.

Reference will now be made to the accompanying drawings in which.

Figure 1:
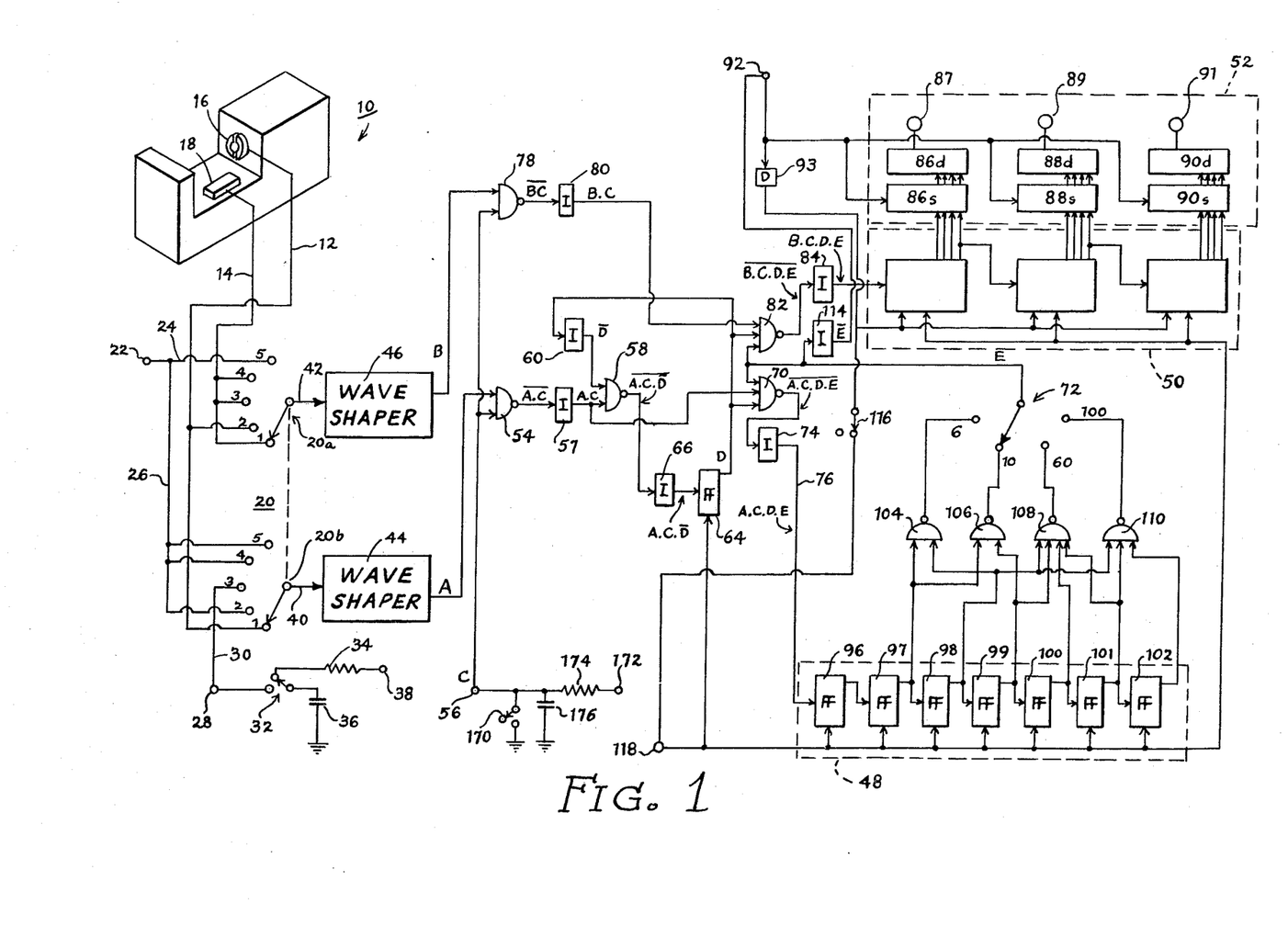
FIG. 1 is a functional block diagram of a ratio computer constructed in accordance with one embodiment of the present invention, and shown in association with a machine tool.

Referring now to FIG. 1, there is illustrated in diagramatic form a lathe 10 from which two signals representative of two operands are derived. The signals are developed by suitable transducers on the lathe, and are delivered to lines 12 and 14. The transducer connected to the line 12 is associated with the spindle 16 of the lathe to develop pulses in response to incremental rotation of the spindle, and the transducer connected to the line 14 is associated with a carriage 18 to develop pulses in response to incremental movement or position of the carriage 18. The signals on the lines 12 and 14 are both in the form of pulse trains of variable frequency, the frequency dependent upon the velocity of movement being sensed. Each pulse indicates the movement of the carriage 18 by a predetermined increment or the rotation of the spindle 16 by a predetermined increment. Accordingly, the total number of pulses on each line, during any period of time, indicates the total movement or rotation of the associated member during that time.

The pulses on the lines 12 and 14 are representative of position or velocity operands and are selectively connected to the inputs of the ratio computer through a five positon selector switch 20 having two ganged sections 20a and 20b. The switch 20 is manually rotatable to select a different combination of operands at each switch position. The positions of the switch 20 are designated 1 through 5 in clockwise sequence.

A terminal 22 is connected to switch section 20a, position 5, via a line 24, and to switch section 20b, positions 2, 4 and 5 via a line 26. A terminal 28 is connected with the switch section 20b, position 3, via a line 30. The terminal 22 is connected to a source of a.c. voltage having a frequency of 60 Hz., and may readily be derived from a conventional wall outlet. The terminal 28 is connected with a manually operable switch 32 which is closed when it is desired to furnish a single pulse as one of the operands of the computer. The switch 32, when closed, connects the terminal 28 to a capacitor 36. When the switch 32 is open, as shown, the capacitor 36 is charged through a resistor 34 from a source of positive potential connected to a terminal 38, to which the resistor 34 is connected.

When the selector switch 20 is in its first position, as shown in FIG. 1, the line 12 is connected through the switch section 20b to a line 40 and the line 14 is connected through the switch section 20a to a line 42. A wave shaper 44 is connected to the line 40 to receive the pulses on the line 12 and is operative to shape the pulses into standard rectangular pulses of sufficient amplitude to operate the logic units which are connected with the output of the wave shapers 44 and 46. A similar shaper 46 is connected to the line 42 to shape and standardize the amplitude of the pulses on the line 42. The major logic units which are connected with the shapers 44 and 46 comprise a time base counter 48, a parameter counter 50, and a display unit 52. In addition to these three major units there are a number of NAND gates and one control flip-flop which regulate the operation of the counters 48 and 50 and the display unit 52. The function of the time base counter 48 is to count pulses received from the shaper 44 whereas the counter 50 counts pulses received from the shaper 46. The counting of both counters ends when the counter 48 reaches a predetermined value, at which time the display unit 52 displays the contents of the counter 50 in arabic numeral form. Accordingly, the quantity displayed is representative of the number of pulses furnished by the wave shaper 46 within the period defined by a predetermined number of pulses furnished by the shaper 44.

When the selector switch 20 is in its first position, as illustrated in FIG. 1, the counter 48 receives the pulses made available on the line 12 and the counter 50 receives the pulses made available on the line 14, as will now be described.

A NAND gate 54 has one input terminal connected to the output of the shaper 44 and another input connected to a terminal 56. The terminal 56 is connected to a source of positive potential when the computer is effecting a calculation. The NAND gate 54 is one of a number of identical gates employed in the computer and functions to present a signal at its output which is the complement of the two inputs gated together. Signals will hereinafter be referred to as being "true" when a relatively positive potential is exhibited and "false" when a relatively negative or ground potential is exhibited. Thus, the output of each NAND gate is false if and only if both of its inputs are true.

The signal derived from the output of the shaper 44 is hereinafter referred to as the A signal, or the one representative of the A operand. The signal at the terminal 56 is hereinafter referred to as the C signal, which goes true at the beginning of the first calculation. The inputs to the NAND gate 54 are A and C, and its output is the complement of A and C or $\overline{A \cdot C}$.

The output of the NAND gate 54 is connected to an inverter 57 which complements or inverts its input, so that the output of the inverter 57 is A·C. This output is connected to one input of a NAND gate 58. The other input of the NAND gate 58 is connected to the output of an inverter 60.

The input of the inverter 60 is connected to the output of a control flip-flop 64, which is hereinafter referred to as the D signal, and is so indicated in FIG. 1. The output of the inverter 60 is therefore the complement of D (or $\overline{D}$). The output of the NAND gate 58 is therefore $\overline{A \cdot C \cdot \overline{D}}$. The output of the NAND gate 58 is connected through an inverter 66 to an input of the control flip-flop 64. Accordingly, the flip-flop 64 is caused to change its state when A·C·$\overline{D}$ is true. $\overline{D}$ is true (or D is false) during the initial operation of the ratio computer, and C is true during the course of a calculation, as described above. Therefore, the occurrence of the first A pulse derived from the line 12 makes A·C·$\overline{D}$ true and a pulse is applied to the flip-flop 64, causing it to change its state and inverting its output. Accordingly the output of the flip-flop 64, viz. the D signal, becomes true. Further operation of the NAND gate 58 is inhibited as long as D is true so that the flip-flop 64 can be reset to its former state only through another input. This occurs at the end of a calculation, as will be described hereinafter.

A NAND gate 70 has one of its inputs connected to the output of the flip-flop 64 and another input connected to the output of the inverter 57. A third input of the NAND gate 70 is connected to the rotating contact of a time base selector switch 72. The signal produced by the switch 72 and connected to the NAND gate 70 is referred to hereinafter as the E signal. The E signal is true until the counter 48 has counted the number of pulses selected by operation of the switch 72.

The output of the NAND gate 70 is $\overline{A \cdot C \cdot D \cdot E}$, and this is connected through an inverter 74 over a line 76 to the counter 48. The inverter 74 provides a signal at its output when A·C·D·E is true. C is normally true and D is true after the flip-flop 64 has been set. E is true as long as the counter 48 has not reached the count preset by the selector switch 72. Accordingly, A·C·D·E is true during each A pulse, and the A pulses conveyed to the counter 48 over its input line 76 are counted therein. The initial contents of the counter 48 is zero so that the contents of the counter 48 correspond to the total number of A pulses produced since the D signal became true.

The output of the wave shaper 46 is connected to an input of the NAND gate 78. Another input of the NAND gate 78 is connected to the terminal 56. Accordingly, the output of the NAND gate 78 is $\overline{B \cdot C}$. The output of the NAND gate 78 is connected to an inverter 80, and the output of the inverter is therefore B·C.

A NAND gate 82 has one input connected to the output of the inverter 80, another input connected to the output of the flip-flop 64 and a third input connected to the switch 72, and so the output of the NAND gate 82 is $\overline{B \cdot C \cdot D \cdot E}$. An inverter 84 has its input connected to the output of the NAND gate 82, and its output is B·C·D·E, which is true for each B pulse after the flip-flop 64 is set. The output of the inverter 84 is connected to the input of the counter 50. Accordingly, each pulse on the line 14, corresponding to incremental movement of the carriage 18, results in the counting of a B pulse in the counter 50.

The display unit 52 includes three storage units 86s, 88s and 90s and three decoder units 86d, 88d and 90d. Each storage unit is connected to a decade of the counter 50, and the decoder units are connected to corresponding storage units. Three lamps 87, 89 and 91 are provided, one for each decoder unit. Although the counter 50 and the display unit 52 are illustrated as having three stages, four or more stages of each may be provided without departing from my invention. The lamps 87, 89 and 91 are preferably of the type having seven-segments which may be illuminated in various combinations to form arabic numerals, such as the commercially available Dialight Model No. 710-0301-005. The counter 50 in the preferred embodiment of the present invention is a binary coded decimal counter having three decades each coded in binary. The storage units 86s, 88s and 90s are connected to the three decades by four lines each, by which the representation of the number stored in each decade is communicated to the decoder units in binary coded decimal. The function of the storage units is to store the quantity transferred from the counter, while the decoder units translate the binary coded decimal input from each decade into appropriate signals to drive the seven segment indicator lamps 87, 89 and 91. The storage units 86s, 88s and 90s are set to the quantity manifested by the counter 50, upon application of a pulse to a terminal 92, and the decoder units 86d, 88d and 90d immediately produce the driving signals necessary to operate the lamps 87, 89 and 91 so that they display, in arabic numeral form, the quantity stored in the storage units. When another pulse is applied to the terminal 92 the storage units are again set, and the lamps display the new quantity. A delay unit 93 is connected between the terminal 92 and the resetting inputs of the decades of the counter 50, so the counter 50 is reset shortly after the storage units are set.

The counter 48 contains seven identical flip-flops 96 through 102 which are connected in cascade relationship so that the flip-flops form together a binary counter.

A NAND gate 104 has two inputs connected to the outputs of the flip-flops 97 and 98 which both become true after six pulses have been counted by the counter 48. The output of the NAND gate 104 is therefore false only when the counter 48 is registering six and is at all other times true. The count of six is recognized when the switch 76 is in its clockwise most position to select the output of the NAND gate 104. A NAND gate 106 has its inputs connected to the outputs of flip-flops 97 and 99 which both become true when 10 pulses have been counted by the counter 48. Accordingly, if the switch 72 is caused to select the output of the NAND gate 106, a count of 10 is recognized when the output of this NAND gate goes false.

A NAND gate 108 has four inputs connected to the outputs of flip-flops 98, 99, 100 and 101, all of which become true when 60 pulses have been received by the counter 48. Another NAND gate 110 has three inputs connected to the outputs of flip-flops 98, 101 and 102, all of which become true when 100 pulses have been received by the counter 48. In each case the output signal E from the time base selector switch 72 goes false upon the occurrence of the count selected by the switch 72.

The counter 48 receives A pulses derived from the line 12, in response to incremental rotation of the spindle 16, and when the spindle has rotated far enough to generate the number of pulses selected by the switch 72, the signal E goes false and disables both the NAND gates 70 and 82, to prevent further pulses from reaching the counters 48 and 50. The E signal from the switch 72 is also connected through an inverter 114 to the terminal 92, to cause the lamps 87, 89 and 91 to display the count stored within the counter 50. This count corresponds to the number of pulses supplied to the line 14, derived from movement of the carriage 18. The number of pulses counted by the counter 50 thus corresponds to the distance moved by the carriage 18 during the time the spindle 16 was rotated through an angle determined by the selector switch 72, and is therefore proportional to the ratio of the carriage velocity to the angular velocity of the spindle 16.

The output of delay unit 93 is also supplied through a switch 116 to a terminal 118 and thence to inputs of the flip-flop 64 all of the flip-flops of the counter 48, and the three decades of the counter 50 to reset all of them to their original state to prepare for a subsequent calculation. The next A pulse then sets the control flip-flop 64, in the manner which has been described above, and another calculation ensues, after which the display units 86, 88 and 90 are triggered by an $\overline{E}$ pulse applied to the terminal 92 to display the result of the subsequent calculation. In this way, the lamps 87, 89 and 91 continuously display up-to-date parameters derived by successive calculations of the computer.

If it is desired to have the display unit 52 continue to manifest the result of a single calculation, the switch 116 is opened to prevent resetting the control flip-flop 64 and the counters 48 and 50 until the switch 116 is closed again.

The operation of the computer has been described above with particular reference to its mode of operation in which the ratio of the carriage velocity to the angular velocity of the spindle is monitored. This is the mode of the system when the selector switch 20 is in the position illustrated. Four other modes of the computer are possible.

When the selector switch 20 is in its second position the A pulses are derived from the 60 Hz. voltage supplied to the terminal 22 and the B pulses are derived from the line 12. The B pulses have a frequency proportional to the angular velocity of the spindle 16, whereas the frequency of the A pulses is 60 Hz. The number of B pulses counted by the counter 50 during the period selected by the switch 72 is directly proportional to the angular velocity of the spindle 16. The scale factor (or proportionality constant) may be selected by means of the selector switch 72, and also by selecting the rate at which the spindle 16 produces its incremental pulses, as is described hereinafter. If one pulse per revolution of the spindle 16 is supplied to the line 12, and the switch 72 is set to 60, the counter 50 is counted during each interval with the number of revolutions per second of the spindle 16. If the selector switch 72 is set to 10, instead of 60, the number indicated by the display unit 52 will be one-sixth of the number of revolutions per second of the spindle 16. The parameter displayed by the display unit 52 remains proportional to the angular velocity of the spindle 16, but the scale has been changed by a factor of 6. Another time base may be selected by adjustment of the selector switch 72 in order to provide an accurate indication of the angular velocity of the spindle 16, while insuring that the number of pulses counted by the counter 50 during each calculation does cause an overflow.

When the selector switch 20 is in its third position, a single A pulse is produced when the switch 32 is closed, and the B pulses are derived from the carriage 18, in response to incremental movement thereof. The single A pulse is counted by the counter 48, but a count of one does not produce a pulse at the selector switch 72, and the counter 50 counts the B pulses continuously.

The terminal 92 is supplied with pulses at the appropriate times to cause the display unit 52 to continuously display the contents of the counter 50. Each B pulse corresponds to an incremental movement of the carriage 18 and advances the counter 50 by one unit, which advance is indicated by the display unit 52. The arabic number displayed by the display unit 52 therefore corresponds to the position of the carriage 18 at that moment, relative to the position it was in when the closing of the switch 32 initiated the calculation. The calculation can be repeated at any time with reference to a new starting point of the carriage 18, simply by clearing the counters 48 and 50 by applying a pulse to the terminal 118 and actuating the switch 32. The counter 50 then continues to count as before, with the position of the carriage 18 relative to the new reference point constantly displayed.

When the selector switch 20 is in its fourth position, the A pulses are again derived from the 60 Hz. source applied to the terminal 24, and the B pulses are derived from the line 14. The apparatus functions in this mode in the same manner as when the selector switch is in its second position, except that it is the velocity of the carriage 18 which is registered in the counter 50 and indicated by the display unit 52 instead of the angular velocity of the spindle 16.

The fifth position of the selector switch 20 functions to connect the 60 Hz. source from the terminal 24 to both the wave shapers 44 and 46, to cause simultaneous generation of A and B pulses. In this mode the counter 50 counts one pulse for each pulse counted by the counter 48 and the display device 52 therefore registers a number equal to the time base selected by the selector switch 72. This mode of operation permits the operation of the computer to be checked. When the display device 52 indicates the number selected by the switch 72, proper operation of the counters 48 and 50 and their associated logic circuits is verified.

Figure 2:
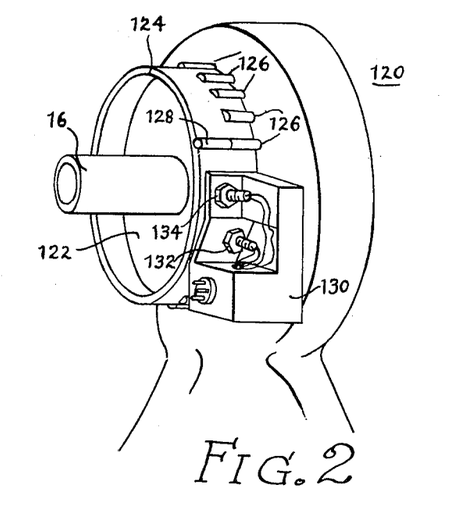
FIG. 2 is a perspective view of a transducer for developing pulses in response to incremental rotation of a shaft, employed to generate one of the operands used in the apparatus of FIG. 1.

Referring now to FIG. 2 there is shown apparatus for developing incremental pulses in response to rotation of the spindle 16. The spindle shaft 16 is supported for rotation in a housing 120 by means of suitable bearings (not shown). A wheel 122 is mounted on the spindle 16 and rotates therewith. The wheel 122 has a cylindrical flange 124 at its outer periphery, and 36 projections 126 are equally spaced around the outer surface of the flange 124, about 10° apart. One additional projection 128 is also secured to the flange 124 at a location which is offset from the circular path of travel of the projections 126 as the wheel 122 turns with the spindle 16.

The housing 130 rigidly mounted to the housing 120, supports a pair of magnetic pickup transducers 132 and 134. The transducer 132 is supported so that an end of the transducer is slightly displaced outwardly from the path of travel of projections 126. Each projection 126 induces a signal as it is rotated past magnetic pickup transducer 132. Since there are 36 of the projections 136 the transducer 132 produces 36 pulses per revolution of the spindle 16, each corresponding to an incremental rotation of 10°.

The magnetic pickup transducer 134 is supported on the housing 130 with its end slightly displaced outwardly from the path of the projection 128. As there is only one projection 128, the transducer 134 produces one pulse per revolution of the spindle 16, corresponding to 360° of rotation.

The transducers 132 and 134 may be of the type which is commercially available and sold by Airpax Electronics as model No. 340-0001 or model No. 1-0007. The output of either of the transducers 132 or 134 may be connected to the line 12 by means of a suitable switch so that the scale factor of the pulses presented on the line 12 may be changed by a factor of 36.

Figure 3:
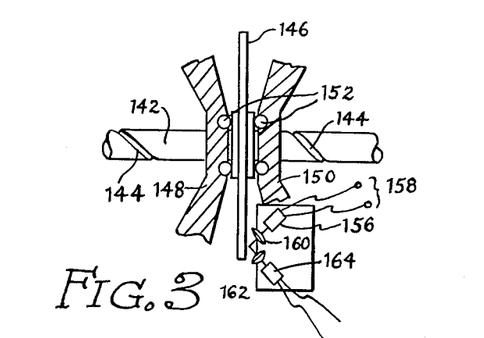
FIG. 3 is a vertical cross section of a transducer for developing pulses in response to incremental movement of a rectilinearly movable member, employed to generate one of the operands used in the apparatus of FIG. 1.
Figure 4:
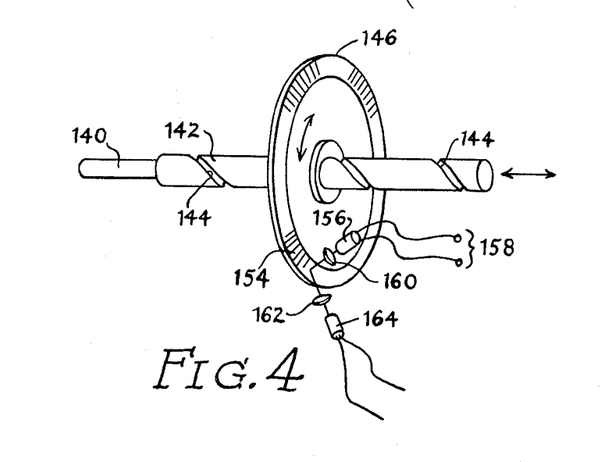
FIG. 4 is a perspective view of the apparatus of FIG. 3.

Referring now to FIGS. 3 and 4, a mechanism is illustrated for deriving pulses from movement of the carriage 18, so that one pulse is produced for each incremental movement of the carriage 18. A shaft 140 is connected for reciprocal movement with the carriage 18 and a cylinder 142 is connected with the shaft 140. A helical slot 144 is cut into the cylinder 142 and has a length measured along the axis of the cylinder 142 at least as great as the range of rectilinear movement of the shaft 140 along its axis. A disk 146 is mounted for rotation on the cylinder 142 and is provided with a spline or key (not shown) slidable in the slot 144. The disk 146 is restrained from rectilinear movement axially of the cylinder 142 by means of a yoke secured to the frame of the machine tool and having a pair of arms 148 and 150 extending generally parallel to the disk 146 on both sides thereof. A set of bearings 152 are imposed between the arms 148 and 150 and the disk 146 to permit the disk 146 freely to rotate about the cylinder 142 while restraining axial movement thereof.

The outermost zone of the disk 146 is provided with a multiplicity of equally spaced marks 154. The marks 154 are preferably painted on, or otherwise applied to the surface of the disk 146 in such a way as to provide a maximum contrast between the appearance of the marks themselves and the background of the disk 146. The marks are illuminated by means of a light-emitting diode 156, energized by means of a source of voltage applied to its terminals 158. The light generated by the diode 156 is focused onto the marks 154 by means of a lens 160. A portion of the light is reflected from the marks 154, or from the spaces between the marks, and passes through a lens 162 to reach a phototransistor 164. The lens 160 focuses light from the photodiode 156 onto a small area of the disk 146, so that only a single mark is illuminated, or no mark is illuminated, depending on the angular position of the disk 146. The phototransistor is connected with a supply of voltage, in the manner well understood by those skilled in the art, to produce an output signal of one polarity of magnitude when a mark is illuminated by the photodiode 156 and a signal of a different polarity or magnitude when no mark is illuminated by the light from the photodiode 156. Accordingly, one pulse is produced for each increment of rotation of the disk 146. In a preferred embodiment, the marks 154 are spaced on the disk 146 so that a single pulse is produced by the phototransistor for each 0.001 inch of linear motion of the shaft 140. The generation of the pulses by the phototransistor 164 is in no way dependent upon the velocity of the disk 146, but depends wholly upon successive marks 154 becoming illuminated. Therefore there is no minimum speed of movement of the shaft 140 or of the carriage 18 which must be achieved for the production of pulses from the phototransistor 164. Extremely low speeds of the carriage 18 are detectable, and the position of the carriage 18 may be determined with accuracy irrespective of how slowly the carriage 18 may be moving.

In the operation of the present invention, one of the transducers 132 and 134 is selected for connection to the line 12, and the counters 48 and 50 and the control flip-flop 64 are cleared or reset by application of a pulse to the terminal 118. Such a pulse may conveniently be generated by means of a manually operated switch similar to the switch 32. The time base selector 72 is set to the desired time base, and the parameter selector switch 20 is set in accordance with the parameter which is to be displayed. During these preliminary operations, the terminal 56 has a relatively negative voltage applied thereto, because of a switch 170 connecting the terminal 56 to ground. This prevents the NAND gates 54 and 78 from generating outputs in response to the A and B pulses produced by the wave shapers 44 and 46.

When the calculation is to begin, the switch 170 is actuated so that a terminal 172 is connected to the terminal 56 through a resistor 174. A capacitor 176 is connected from the terminal 56 to ground. The terminal 172 is connected to a source of positive voltage so that the NAND gates 54 and 56 become operative to pass the A and B pulses as soon as the switch 170 is actuated. This permits the calculation to begin with the first A pulse, which sets the control flip-flop 64 as described above.

The time base selector switch 72 determines whether the velocity operands are based on instantaneous or average velocity. If the time base selector switch 72 is set to 6, only six A pulses are required to generate a coincidence signal in the form of an E pulse and trigger operation of the display unit 52. If on the other hand the switch 72 is set to 100, 100 pulses are counted in the counter 48 before the display unit 52 is triggered, thus averaging the velocity over a much larger interval. Selection of one of the transducers 132 and 134 adjusts the scale factor of the pulses derived from the spindle 16, so that the interval over which the ratio of the carriage velocity to the spindle velocity is calculated is extended over a wider range when the parameter selection switch 20 is in its first position, in which the A pulses are derived in response to spindle rotation.

The ratio computer of the present invention may thus be readily made to produce frequent indications of the desired parameter, calculated over relatively short time intervals, or less frequent indications calculated over larger intervals. The operator may select whichever is the more desirable for any given application.

Figure 5:
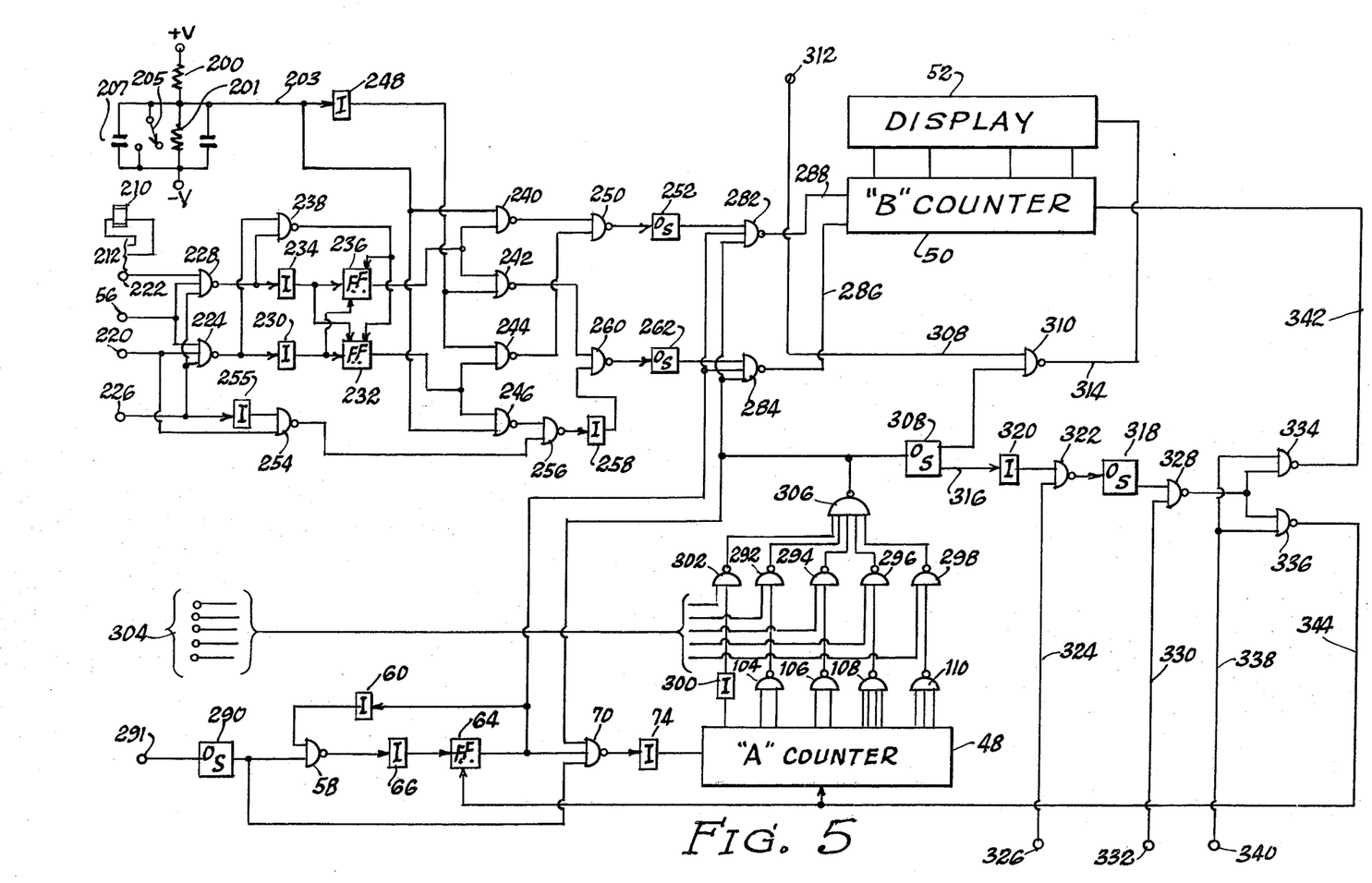
FIG. 5 is a functional block diagram of an alternative embodiment of the present invention.

Referring now to FIG. 5, there is shown a schematic diagram of an alternative embodiment of the present invention which is adapted to permit the B counter 50 to count in both forward and reverse directions, to accommodate movement of the movable member in either a forward or a reverse direction. Portions of the apparatus which are identical to that illustrated in FIG. 1 are designated in FIG. 5 by the same reference numerals.

A pair of resistors 200 and 201 are connected between a source of positive voltage and a source of negative voltage, and the junction of the two resistors is connected to a line 203. A switch 205 is connected across the resistor 201 and operates to short circuit the resistor when the switch is closed. A relay contact 207 is connected in parallel with the switch 205 so that it also may short out the resistor 201 when a relay 210 is acutated. The relay 210 is connected by leads 212 to the motor controller of one drive of the machine, and functions to close the relay contacts 207 when the drive is running in its reverse direction. For normal forward operation of the drive, the relay contact 207 remains open. The switch 205 permits shorting the resistor 201 manually, even when the relay 210 is not operated.

The effect of shorting the resistor 201 is to connect a negative source of potential directly to the line 203, which affects the operation of the apparatus to cause the B counter 211 to count downwardly instead of upwardly, in accordance with the number of B pulses applied thereto.

The transducer (not shown) which produces the B pulses is adapted to produce two pulses in phase quadrature on a pair of terminals 220 and 222. Conveniently, the transducer incorporates two of the units illustrated in FIG. 4, with the disk 146 of each unit mounted on the same shaft but rotated slightly with respect to each other. One unit produces B1 pulses, and the other produces B2 pulses.

The terminal 220 is connected to the source of B1 pulses while the terminal 22 is 222 to the source of B2 pulses. The pulses are sequenced so that when the machine drive is rotating in a clockwise direction, the B2 pulses lead the B1 pulses whereas when the drive is rotating in a counterclockwise direction the B1 pulses lead the B2 pulses. In either case, there is an interval when neither the B1 nor the B2 pulses exist, followed successively by intervals when only one such pulse exists, then both, and then the other alone. This sequence is repeated as long as the drive continues to rotate.

The terminal 220 is connected to one input of a NAND gate 224. The other two inputs of the NAND gate 224 are connected to a signal controlling input 56 from the switch 170 (shown in FIG. 1) and to a terminal 226. The terminals 56 and 226 are normally connected to a relatively high potential. The B2 pulses on the input 222 are connected to one input of a NAND gate 228, the other two inputs of which are connected to the input of the terminals 56 and 226.

The output of the NAND gate 224 is connected through an inverter 230 to the enabling input of a flip-flop 232. The output of the gate 228 is connected through an inverter 234 to the clock input of the flip-flop 232. In a similar manner the output of the inverter 234 is connected to the enabling input of a flip-flop 236 and the output of the inverter 230 is connected to the clock input of the flip-flop 236.

One or the other of the flip-flops 232 and 236 is operated during each cycle of the B pulses, depending upon the direction of rotation of the drive. If the B2 pulse leads the B1 pulse, as when the drive is rotated in a clockwise direction, the flip-flop 236 is enabled by the B2 pulse and caused to change its state at the beginning of the B1 pulse. The flip-flop 232 is clocked at the beginning of the B2 pulse, but is not enabled at this time and therefore does not change state.

A NAND gate 238 has its two inputs connected to the outputs of the gates 224 and 228 so that its output is high whenever either or both of the B1 or B2 pulses exist. When both pulses terminate the level on the output of the gate 238 drops. The output of the gate 238 is connected to the reset inputs of the flip-flops 232 and 236 so that they are reset once during each cycle of the B2 pulses.

The output of the flip-flop 236 is connected to one input each of NAND gates 240 and 242, and the output of the flip-flop 232 is connected in similar fashion to one input each of the NAND gates 244 and 246. The second input of the NAND gates 240 and 246 is connected to the line 203. The second input of the NAND gates 242 and 244 are connected through an inverter 248 to the line 203. Accordingly, a pulse is produced once during each B pulse cycle by one of the four NAND gates 240 through 246, depending upon the direction of rotation of the drive and the condition of the line 203, which is effected by operation of the reverse relay 210 or the switch 205. The level of the line 203 is normally low for forward operation so that the NAND gate 242 is the only one to pass pulses (at the B2 pulse time) as long as the drive is rotated clockwise in a forward direction.

The outputs of the gates 240 and 244 are connected to two inputs of a NAND gate 250, the output of which is connected to the input of a one-shot multivibrator 252.

The one-shot 252 produces a pulse of standard length in response to the occurrence of a B pulse, to insure that the pulse persists long enough to actuate the B counter for one count.

The terminal 220 is connected to one input of a NAND gate 254 and the terminal 226 is connected through an inverter 256 to the other input of NAND gate 254. The output of the NAND gate 254 is connected to one input of the NAND gate 256, the other input of which is connected to the output of the NAND gate 246. The output of the NAND gate 256 is connected through an inverter 258 to one input of the NOR gate 260, and the other input of the NOR gate 260 is connected to the output of the NAND gate 242. The output of the NOR gate 260 drives a one-shot multivibrator 262 which performs the same function as the one-shot 252.

When the output from the NAND gate 254 is high, the NAND gate 256 and the inverter 258 simply invert the output from the NAND gate 246 twice, and thus effectively connect the unmodified output of the NAND gate 246 to the NOR gate 260. When the level in the terminal 226 drops, however, the gates 224 and 228 are inhibited from passing B1 or B2 pulses over the paths described, and instead B1 pulses are passed through the gates 254 and 256. The gate 256 is enabled by the output of the gate 246 for its input from the flip-flop 232 is low whatever may be the condition of the line 203. Accordingly, the B1 pulses operate the one shot 262 irrespective of the condition of the forward or reverse switch, and also independently of the direction of rotation of the drive, which influences the relay contact 207.

The output of the one-shot 262 is connected to one input of a NAND gate 284. When the B counter 50 is to be operated the other two inputs of the NAND gate 284 are high and the pulses are passed over a line 286 to the forward counting input of the B counter 50. Pulses produced by the one-shot 252, when it is operative, are passed through the NAND gate 282 over a line 288 to the reverse input of the counter 50 to cause it to decrease its counts by one for each such pulse.

One input of each of the NAND gates 282 and 284 is connected to the output of the synchronizing flip-flop 64, which has been described in reference to FIG. 1. The circuitry connected with the flip-flop 64 is identical to that illustrated and described with reference to FIG. 1, except that a one-shot multivibrator 290 is connected between the A pulse input 292 and the gates 58 and 70, in order to standardize the length of the A pulses to insure operation of the A counter.

The A counter 48 is identical in operation to that illustrated and described in FIG. 1, but the manner of obtaining a pulse at the end of a predetermined number of counters applied to the A counter is modified. The four NAND gates 104 through 110 are connected in the manner illustrated in FIG. 1, but the outputs of these gates, instead of being connected to the switch 72 as in FIG. 1, are connected to the inputs of four NAND gates 292, 294, 296 and 298, respectively. In addition, the first order of the A counter is connected through an inverter 300 to one input of the NAND gate 302, to provide an output from the A counter when one cycle of the B counter is desired for each A pulse. A second input of each of the NAND gates 292, 294, 296, 298 and 302 is connected to an individual one of a set of input terminals 304, which are connectable either to ground or to a source of positive voltage by means of manually operable switches (not shown). One of the terminals 304 is connected to a positive voltage in accordance with the desired number of A pulses for each cycle of the B counter, thus enabling one of the five NAND gates which are connected thereto. These five NAND gates have their outputs connected to the five inputs of a NAND gate 306, the output of which is connected to one input of the NAND gates 282 and 284 and 70. When the preset count of the A counter has been reached, the state of the output of the gate 306 changes and disables the gates 282 and 284 to inhibit further counting by the B counter. It also inhibits the gate 70 to block further counting by the A counter. The output of the gate 306 is connected to a one shot multivibrator 308. The output of the one shot 308 is connected to one input of the NAND gate 310 and the other input of the NAND gate 310 is connected to a terminal 312 which is normally high. When the one-shot 308 is actuated its output drops, causing the output of the NAND gate 310 to go high and produce a pulse on a line 314. The line 314 is connected to the read input of the display unit 52 to cause the content of the B counter 50 to be displayed by the display lamps.

The one-shot 308 is provided for the purpose of insuring that the read pulse applied to line 314 persists long enough to insure that the count of the B counter 50 gets transferred to the display lamps. The output which is connected to the NAND gate 310 therefor goes low immediately upon triggering of the one-shot 308 and persists for a duration controlled by the time constant of the one-shot, after which it again becomes high, and the read pulse on the line 314 is extinguished.

The pulse produced from the other output 316 of the one-shot 308 is opposite in sign to that produced by the output applied to the gate 310, and accordingly goes high for the period that the read pulse on the line 314 is low. At the conclusion of this period, the pulse on the line 316 goes low and triggers a one-shot 318, which is connected thereto through an inverter 320 and a NAND gate 322. The second input of the NAND gate 322 is connected over a line 324 to a terminal 326 which is normally positive. The output of the one-shot 318 goes high for a duration controlled by the time constant of the one-shot 318, beginning at the end of the read pulse. It is applied to one input of a NAND gate 328, the other input of which is connected over a line 330 to a terminal 332 which is normally high.

The output of the gate 328 is connected to one input each of a pair of gates 334 and 336. A second input of each of the gates 334 and 336 is connected to a line 338 to a terminal 340 which normally remains high. The output of the gate 334 is connected over a line 342 to the reset input of the B counter and the output of the gate 336 is connected over a line 344 to the reset of the A counter, and also resets the flip-flop 64. The pulse produced by the one-shot 318 is passed by the gates 328, 334 and 336 to reset the A and B counters following reading of the B counter into the display lamps. When the one-shot 318 times out, the reset pulse vanishes.

The terminal 326 is connected to switch means for effecting a blanking of the B counter display when the drive of the machine is in its rapid traverse mode. When this is the case, the potential at the terminal 326 drops to a low value and inhibits operation of the one-shot 318. Accordingly, the A counter is not reset and the potential at the output of the gate 306 remains low, thereby blocking the gates 282, 284 and 70, so that no further counting of either A or B pulses can occur. At the conclusion of the rapid traverse the potential on the terminal 326 again rises to permit normal operation to resume.

The terminal 340 is provided for the purpose of permitting clearing of the A and B counters whenever desired in order to start a new cycle of operation with the first ensuing A pulse. The terminal 340 is connected to a manual switch (not shown) whereby the potential on the terminal 340 may be selectively lowered, causing the gates 334 and 336 to pass a reset pulse to the A and B counters and the flip-flop 64.

When a single cycle of operation is desired, the terminal 332 is connected to a source of low potential in order to block operation of the gate 328, thereby preventing passage of a reset pulse generated by the one-shot 318. A single cycle of operation may then be initiated by momentarily connecting the terminal 340 to a source of low potential which generates a clear pulse for the A and B counters and the flip-flop 64 and permits a single cycle of operation to be performed. After a single cycle the output of the gate 306 remains low to inhibit further operation until the terminal 340 is again connected momentarily to a source of low potential.

The manually operated switch means connected to the terminals 312, 226, 304, 326, 332 and 340 are preferably identical to that shown connected to the line 203, but may be of any other conventional design for selectively connecting a high or a low potential to the various terminals.

In the foregoing an exemplary embodiment of the present invention has been described with reference to particular parameters which may be calculated and displayed. It will be apparent to those skilled in the art that while the above description has specifically referred to generation of pulses in response to rotation of a spindle or movement of a carriage, a computer constructed in accordance with the present invention may employ signals derived by other means to represent operands in the calculation of desired parameters. For example, the relative movements of two different carriages may be employed to generate the two pulse trains required by the computer, or the two pulse trains may be generated by means of transducers responsive to the movement of a single carriage in two different directions. Other modifications of my invention will also be apparent to those skilled in the art after having read the above description.

What is claimed is:

1. In a ratio computer for use with a measuring device having transducer means for generating a pulse for each increment of movement of a movable member associated with said measuring device, the combination comprising first bi-directional counter means for counting the pulses from said transducer, means for rendering said first counter means to count upwardly when said movable member is moving in one direction and for rendering said first counter means to count downwardly when said movable member is moving in an opposite direction, a source of reference pulses, second counter means connected to said source for counting said reference pulses, time base selector means connected to said second counter means and operative to produce a coincidence signal when said second counter means has counted a preselected number of said reference pulses, indicator means, control means connected to said indicator means, said first counter means and said selector means to cause said indicator means to generate a display related to the number of pulses counted by said first counter means during the interval ending with the production of said coincidence signal, and switch means connected with said first counter means and said second counter means for simultaneously initiating counting by said first and second counter means.

2. Apparatus according to claim 1, including means for producing said reference pulses at a constant frequency, whereby the number of pulses displayed by said indicator means is proportional to the velocity of said movable member.

3. Apparatus according to claim 1, including a manually operable switch means; and logic means interconnecting said manually operable switch means, said transducer, said source of reference pulses, said first counter means and said second counter means, to initiate said interval by simultaneously causing said first counter means to begin counting said pulses from said transducer and said second counter means to begin counting said reference pulses upon actuation of said switch means.

4. Apparatus according to claim 1, including manually operable means for selectively reversing the direction of counting of said first counter means, whereby said first counting means counts downwardly when said movable member is moving in a first direction and upwardly when said movable member is moving in an opposite direction.

5. Apparatus according to claim 1 for measuring the ratio of movement of two movable elements wherein said transducer means generates a pulse for each increment of movement of a first movable element and a second transducer means generates said reference pulses, and wherein said second transducer means generates a reference pulse for each increment of movement of the second movable element.

6. Apparatus according to claim 1, including transducer means for generating two pulses in separate channels for each increment of movement of said movable member, the pulses in one of said channels leading the pulses in the other channel for a first direction of movement of said movable member and the pulse in the other channel leading for the reverse direction of movement, said first counting means being a bi-directional counter, and means connected to said transducer and to said first counter means for causing said first counter means to count upwardly for each pair of pulses from said transducer when the pulse in said first channel leads, and for causing said first counter means to count downwardly for each pair of pulses from said transducer when the pulse in the other channel leads.

7. Apparatus according to claim 6, wherein said last named means comprises first and second bistable devices, means for connecting the pulse in said first channel to an enabling input of said first bistable device and to the clock input of said second bistable device, means for connecting the pulse in the other channel to the enabling input of said second bistable device and to the clock input of said first bistable device, whereby only one of said bistable devices is caused to change its state in response to a pair of pulses from said transducer, means for resetting both of said bistable devices to a reset state for each pair of pulses from said transducer, means connecting said first bistable device to said first counter means for causing said first counter means to count upwardly by one unit for each change of state of said first bistable device from a reset state to a set state and back to a reset state, and means connecting said second bistable device to said first counter means for causing said first counter means to count downwardly by one unit for each change of state of said second bistable device from a reset state to a set state and back to a reset state.

8. The ratio computer of claim 1 adapted for use with a machine tool having a rotary work holding means and said movable member is a tool holder movable relative thereto, wherein said source of reference pulses comprises a reference transducer associated with said rotary work holding means to generate a reference pulse for each unit of work rotation whereby the number of pulses displayed by said indicator means is proportional to the rate of movement of said movable member relative to the rate of movement of said work holding means.

9. The ratio computer of claim 8 wherein said reference transducer comprises a detachable electromechanical transducer that is mounted on the work holding means to generate electrical pulses corresponding to units of work rotation.

10. The ratio computer of claim 9 wherein said transducer means generates a pulse signal for movement of said movable member in one direction which is distinguishable from pulse signals for movement of said movable member in the other direction whereby bi-directional relative movement of said movable member is indicated.

11. In a ratio computer for use with a measuring device having transducer means for generating a pulse for each increment of movement of a movable member associated with said measuring device, the combination comprising first counter means for counting the pulses from said transducer, a source of reference pulses, second counter means connected to said source for counting said reference pulses, time base selector means connected to said second counter means and operative to produce a coincidence signal when said second counter means has counted a preselected number of reference pulses, indicator means, control means connected to said indicator means, said first counter means and said selector means to cause said indicator means to generate a display related to the number of pulses counted by said first counter means during the interval ending with the production of said coincidence signal, means for causing said source of reference pulses to produce only a single pulse at a predetermined time whereby setting said time base selector means to a preselected number greater than unity causes said control means connected to said indicator means and said first counter means to control said indicator means to display the number of pulses counted by said first counter means while said first counter means is counting said pulses from said transducer so that the number of pulses displayed by said indicator means is proportional to the displacement of said movable member from its position at the time of said single pulse, and switch means connected with said first counter means and said second counter means for simultaneously initiating counting by said first and second counter means.

12. In a ratio computer for use with a measuring device having transducer means for generating a pulse for each increment of movement of a movable member associated with said measuring device, the combination comprising first counter means for counting the pulses from said transducer, a source of reference pulses, second counter means connected to said source for counting said reference pulses, time base selector means connected to said second counter means and operative to produce a coincidence signal when said second counter means has counted a preselected number of said reference pulses, indicator means, control means connected to said indicator means, said first counter means and said selector means to cause said indicator means to generate a display related to the number of pulses counted by said first counter means during the interval ending with the production of said coincidence signal, switch means, and logic means interconnecting and said switch means, said transducer, said source of reference pulses, said first counter means and second counter means, said logic means comprising a bistable device having two stable states, means for setting said bistable device into one of its stable states prior to the initiation of said interval, first gate means for interconnecting said transducer and said first counter means, second gate means for interconnecting said source of reference pulses and said second counter means, means connecting an input of said first gate means and an input of said second gate means to an output of said bistable device for disabling said first and second gate means while said bistable device is in its said one state, and means connecting an input of said bistable device with said source of reference pulses and with said switch means for setting said bistable device into its other stable state in response to the first pulse from said source of reference pulses after the actuation of said switch means.

13. Apparatus according to claim 12 including means for causing said source of reference pulses to produce only a single pulse and means for setting said time base selector means to a preselected number greater than unity whereby said indicator means displays the number of pulses counted by said first counter means while said first counter means is counting said pulses from said transducer so that the number of pulses displayed by said indicator means is proportional to the displacement of said movable member from its position at the time of said single pulse.

14. Apparatus according to claim 12 including automatic resetting means periodically resetting both said first counter means and said second counter means and resetting said bistable device to its said one stable state in response to said coincidence signal, said automatic resetting means comprising a time delay means whereby the completion of a time delay interval produces a pulse resetting said first counter means and said second counter means and said bistable device to its one state.

15. Apparatus for measuring, indicating and selectively providing a visual display of the location of a movable tool on a processing machine relative to a known datum or the rate of relative movement comprising transducer means for generating a pulse for each increment of relative movement between the movable tool and the processing machine, first counter means for counting the pulses from said transducer, a source of reference pulses, second counter means connected to said source controlled by said reference pulses, pulse means to initiate said first counter means and disable said second counter means, indicator means controlled by said first and second counter means and said pulse means for indicating the relative location of said movable tool and said processing machine when said second counter means is disabled and to indicate the rate of tool movement when said second counter means is enabled, said transducer means generating two signals in two separate channels for each increment of movement of said movable tool, the two signals in said two channels being in a timed relationship whereby movement of said tool in a first direction produces a first relationship between said two signals and movement of said tool in the opposite direction produces a second relationship between said two signals distinguishable from said first relationship, whereby said indicator means responds in opposite senses to said first and said second relationships to indicate the position resulting from bi-directional movement when said second counter means is disabled and the rate of movement of said tool when said second counter means is enabled.

16. The apparatus of claim 15 wherein said source of reference pulses comprises a clock.

17. Apparatus for measuring, indicating and providing a visual display of the location or rate of movement of a movable tool relative to a known datum or a processing machine which includes a work piece support providing work piece movement relative to the processing machine and the movable tool, said apparatus comprising transducer means for generating a pulse for each increment of relative movement between the movable tool and the processing machine, first counter means for counting the pulses from said transducer, a source of reference pulses comprising a transducer pulse source responsive to the movement of a work piece relative to the processing machine, a clock pulse source and source selection means, second counter means connected to said source of reference pulses for counting said reference pulses, time base selector means connected to said second counter means and operative to produce a coincidence signal when said second counter means has counted a preselected number of said reference pulses, indicator means controlled by said counter means and said coincidence means for indicating the rate of movement of said movable tool and disabling means for disabling said reference pulse source whereby said indicator means indicates the location of said tool means relative to said known datum.

* * * * *

UNITED STATES PATENT OFFICE
CERTIFICATE OF CORRECTION

Patent No. 3,944,799　　　　　　　　　　Dated March 16, 1976

Inventor(s) Peter Gray Brownell

It is certified that error appears in the above-identified patent and that said Letters Patent are hereby corrected as shown below:

Col. 8, line 46, "of" (2nd occurrence) should be --or--

Col. 10, line 18, cancel "22 is" and after "222" insert --is connected--

Col. 16, line 25, "related" should be --proportional--

Signed and Sealed this

Seventeenth Day of August 1976

[SEAL]

Attest:

RUTH C. MASON
*Attesting Officer*

C. MARSHALL DANN
*Commissioner of Patents and Trademarks*